United States Patent [19]

DeJule et al.

[11] Patent Number: 5,084,778
[45] Date of Patent: Jan. 28, 1992

[54] ELECTRODE STRUCTURE FOR REMOVING FIELD-INDUCED DISCLINATION LINES IN A PHASE CONTROL TYPE OF LIQUID CRYSTAL DEVICE

[75] Inventors: Michael C. DeJule, Clifton Park; Donald E. Castleberry, Schenectady, both of N.Y.

[73] Assignee: General Electric Company, Schenectady, N.Y.

[21] Appl. No.: 456,882

[22] Filed: Dec. 26, 1989

[51] Int. Cl.$^5$ ............................................... G02F 1/13
[52] U.S. Cl. ........................................ 359/87; 359/89; 359/92
[58] Field of Search ............... 350/336, 330, 340, 341, 350/346, 334, 333

[56] References Cited

U.S. PATENT DOCUMENTS

| 4,247,174 | 1/1981 | Walter | 350/341 |
| 4,617,646 | 10/1986 | Yang | 350/350 S |

FOREIGN PATENT DOCUMENTS

| 0159196 | 12/1979 | Japan | 350/336 |
| 0028089 | 2/1980 | Japan | 350/336 |
| 0079417 | 6/1980 | Japan | 350/336 |
| 0023016 | 2/1983 | Japan | 350/336 |
| 0221827 | 12/1983 | Japan | 350/336 |
| 0017425 | 1/1985 | Japan | 350/336 |
| 0103503 | 5/1987 | Japan | 350/336 |
| 0299944 | 12/1987 | Japan | 350/336 |
| 0313132 | 12/1988 | Japan | 350/336 |
| 0150115 | 6/1989 | Japan | 350/336 |

OTHER PUBLICATIONS

Surface Pinning of Disclinations and the Stability of Bistable Nematic Storage Display J. Appl. Physic 52(2), Feb. 1981.

Field Effects in Nematic Liquid Crystal . . . J. Appl. Physics, U.S., 12/74.

V. A. Stieb et al., Inversionswande in Dielektrisch Deformierten Flussigkristallschichten, Berichte der Bunsen-Gesellschaft 78 No. 9, pp. 899-902 (1974). (English translation also attached).

*Primary Examiner*—Rolf Hille
*Assistant Examiner*—Tan Ho
*Attorney, Agent, or Firm*—Donald S. Ingraham; James C. Davis, Jr.; Marvin Snyder

[57] ABSTRACT

A liquid crystal device includes at least one pixel electrode, formed on a transparent substrate, and having opposed first and second sides edges. A transparent cover glass is disposed in parallel alignment with the substrate and has a ground plane formed thereon opposite to the pixel electrode. A multiplicity of liquid crystal molecules is sealably contained between the substrate and cover glass. In one embodiment, a field control electrode (FCE) is formed on the substrate proximate to the pixel electrode first side edge. A voltage of proper polarity and magnitude may be applied to the FCE relative to the ground plane electrode to avoid a disclination line (mobile inversion wall) proximate to the pixel electrode first side edge when another voltage of proper polarity and magnitude is applied to the pixel electrode relative to the ground plane electrode. In an alternate embodiment, the ground plane electrode may be patterned to straighten the electric field between the pixel electrode and ground plane electrode to avoid a disclination line (mobile inversion wall) when the pixel is energized.

6 Claims, 4 Drawing Sheets

ELECTRODE STRUCTURE FOR REMOVING FIELD-INDUCED DISCLINATION LINES IN A PHASE CONTROL TYPE OF LIQUID CRYSTAL DEVICE

BACKGROUND OF THE INVENTION

The present invention relates to phase-control type and display type liquid crystal (LC) devices and more particularly, to a novel electrode structure which eliminates the electric field induced disclination line or inversion wall created at the edge of a picture element when a voltage is applied to a LC phase control device cell.

A phase control device may be used to focus, deflect a beam of light or delay the light wavefront in optical applications. A LC device may include at least one transparent pixel electrode formed on a glass substrate. A transparent common or ground plane electrode is formed on a cover glass and is spaced from the pixel electrode(s). The pixel and common electrodes are typically formed from indium tin oxide (ITO) or the like. The glass substrate and cover glass sealably contain a quantity of liquid crystal material; thus, a typical cell or pixel includes liquid crystal material disposed between a pixel electrode and a ground electrode, which effectively forms a parallel plate capacitor disposed between the glass substrate and cover glass.

Before the glass substrate and cover glass are sealed together and filled with liquid crystal material, the common electrode surface and the surfaces of the pixel electrodes and glass substrate surface portions exposed between the patterned pixel electrodes, are all coated with a polymer alignment layer. The polymer layer on the pixel electrodes and glass substrate surface portions are rubbed with a rotating buffing wheel in a selected rub direction (for example, left to right) to cause the molecular alignment of the LC material in a selected direction; the polymer layer on the common electrode is rubbed in an opposite rub direction (right to left) to cause the molecular alignment of the LC material on the common electrode surface. This is commonly known as an anti-parallel-rub configuration. The elongated nematic liquid crystal molecules, when introduced into the LC device, will uniformly align themselves with the longitudinal axes of all molecules being oriented in the rub direction and tilted toward the cover glass at a pre-tilt angle of about one to about three degrees relative to a plane parallel to the substrate. The direction of the pre-tilt angle will be a function of the alignment layer polymer type and type of liquid crystal material, as well as the rub direction.

In operation, a voltage or proper polarity and magnitude is applied to the pixel electrode, relative to the ground plane electrode, to create an electric field extending normally between each pixel electrode and the ground plane or common electrode. The electric field lines will be substantially perpendicular to the two electrodes but will spread outwardly at the edges of the pixel electrode, at an obtuse angle relative to the plane of the pixel electrode, similar to a parallel plate capacitor where one plate is smaller than the other. Liquid crystal molecules with positive dielectric anisotropy will attempt to align themselves with the electric field; the greater the magnitude of voltage applied, the more the LC molecules will rotate from their pre-tilt angle toward the direction of the electric field lines. The outwardly-spreading electric field at one side edge (the right side edge if the rub direction is left to right) of the pixel electrode will exert a force on the LC molecules to rotate the molecules in the same rotational sense as the rotation of the pre-tilt angle relative to the pixel electrode, but the outwardly-spreading electric field at the opposite side edge (left side edge) of the pixel electrode will exert a force on the LC molecules, proximate to this edge, to rotate the LC molecules in an opposite rotational sense from the rotation of the pre-tilt angle relative to the pixel electrode, because the electric field is directed at an angle greater than about 90° relative to the pre-tilt angle of these molecules. This opposite rotational force creates a field-induced disclination or inversion wall between normally tilted LC molecules and those LC molecules near the opposite side edge (left side edge) which are rotated in a counter direction by the spreading electric field. The disclination line is actually a narrow region of LC molecules which are not rotated but remain substantially at the pre-tilt angle.

Viewing the phase control LC device through a polarizing microscope, the region where the disclination line or inversion wall is occurring will transmit the same level or color of light as unexcited LC molecules surroundings the excited pixel. The inversion wall causes loss of lightwave phase coherence in phase control panels because a coherent beam of light, such as from a laser and the like, will encounter two different phase changes and the beam will be split in two different directions. If the phase control device is being used to focus a light beam, the inversion wall will cause scattering and some loss of light.

In liquid crystal display devices (color and monochromatic), the brightness of the light beams are controlled by the orientation of the LC molecules and by polarizers on either side of the cell. The polarizers convert phase changes to amplitude changes; thus, the disclination appears as a difference in brightness on either side of the inversion wall or disclination line which causes a decrease in the contrast ratio of the device. This problems is exacerbated in video applications where high resolution is desired and where the pixels are small. The observed disclination line is actually a "mobile inversion wall" as described more fully below; however, the wall appears more like a line when viewed under the microscope and will be referred to hereinafter as a disclination line.

At a lower pixel electrode voltages, the disclination line is substantially parallel to the one side edge of the pixel electrode when the rub direction is perpendicular to the side edge. As the voltage is increased, the disclination line moves toward the center of the pixel and has a central region borderd on the right and left by a transition region; the transition regions each appear as a dark or light line (depending on the orientation of the polarizers) extending across the face of the LC cell. As the voltage is futher increased between about 10 to about 20 volts, the central region collapses and the transition regions pinch together indicating a different alignment of the LC molecules. Futhermore, the straight disclination line will become wavy or sinusoidal and will become zig-zagged at higher voltages.

It is accordingly a primary object of the present invention to provide a novel liquid crystal cell structure which is not subject to foregoing disadvantages.

It is another object of the present invention to straighten the electric field at the pixel electrode side edge to eliminate the disclination line (mobile inversion wall) for all voltage levels of cell operation.

It is a futher object of the present invention to provide a novel electrode structure for liquid crystal cell which eliminates disclination lines (mobile inversion walls).

These and other objects of the invention, together with the features and advantages thereof, will become apparent from the following detailed specification when read with the accompanying drawings in which like reference numerals refer to like elements.

SUMMARY OF THE INVENTION

In accordance with the present invention, a phase control or display device comprises at least one liquid crystal cell (or pixel) including a transparent substrate with a first side edge, and a second side edge opposite the frist side edge. At least one pixel electrode of transparent material, such as indium tin oxide and the like, is formed on the substrate. The pixel electrode has a first side edge closest to the first side edge and a second side closest to the substrate second side edge. At least one field control electrode (FCE) of transparent material is formed on the substrate proximate to the pixel electrode first side edge. A ground plane electrode common to all pixel electrodes is formed on a transparent cover plate. A first polymer alignment layer is formed on the substrate, FCE and pixel electrode and is rubbed in a selected rub direction, preferably from the substrate first side edge to the substrate second side edge. A second polymer alignment layer is formed over the ground electrode and cover plate and is rubbed in an opposite rub direction relative to the first alignment layer rub direction, when the substrate and cover plate are positioned in substantially parallel alignment. A quantity of liquid crystal (LC) material, having a multiplicity of elongated LC molecules, is sealably contained between the substrate and cover plate. The rubbing causes the longitudinal axis of each elongated LC molecule to align parallel with the selected rub direction, when the LC material is introduced into the cell interior. The longitudinal axis of each LC molecule will also slope toward the cover plate at a pre-tilt angle of between about one and about three degrees relative to a plane parallel to the substrate. An electric field, induced between the pixel and ground electrodes by a voltage of proper polarity and magnitude applied therebetween, causes positive dielectric anisotropic LC molecules to attempt to align themsleves parallel to the field. A second voltage of proper polarity and magnitude applied to the FCE relative to the ground plane electrode will alter the dirction of the electric field at the pixel electrode first side edge to eliminate a disclination line or inversion wall proximate to the pixel electrode first side edge. The FCE is preferably located closer to the pixel electrode first side edge than a second side of an adjacent pixel eledtrode to avoid inducing a declination line or inversion wall in the adjacent pixel proximate to the pixel electrode second side edge.

In an alternate embodiment, only the at least one pixel electrode is formed on the substrate and the ground plane electrode is patterned to have a boundary which aligns substantially with the first side edge of the pixel electrode; therefore the electric field induced, when a voltage of proper polarity and magnitude is applied to the pixel electrode relative to the ground plane electrode, will be oriented substantially perpendicularly between the pixel electrode and ground plane electrode and will not spread out or radiate from the pixel first side edge. The boundary can be formed by patterning the ground plane electrode to correspond in size, shape and alignment with the pixel electrode or a window can be cut in the ground plane electrode which substantially corresponds to the pixel electrode first side edge.

BRIEF DISCRIPTION OF THE DRAWINGS

DETAILED DECRIPTION OF THE PREFERRED EMBODIMENTS

Figure 1:
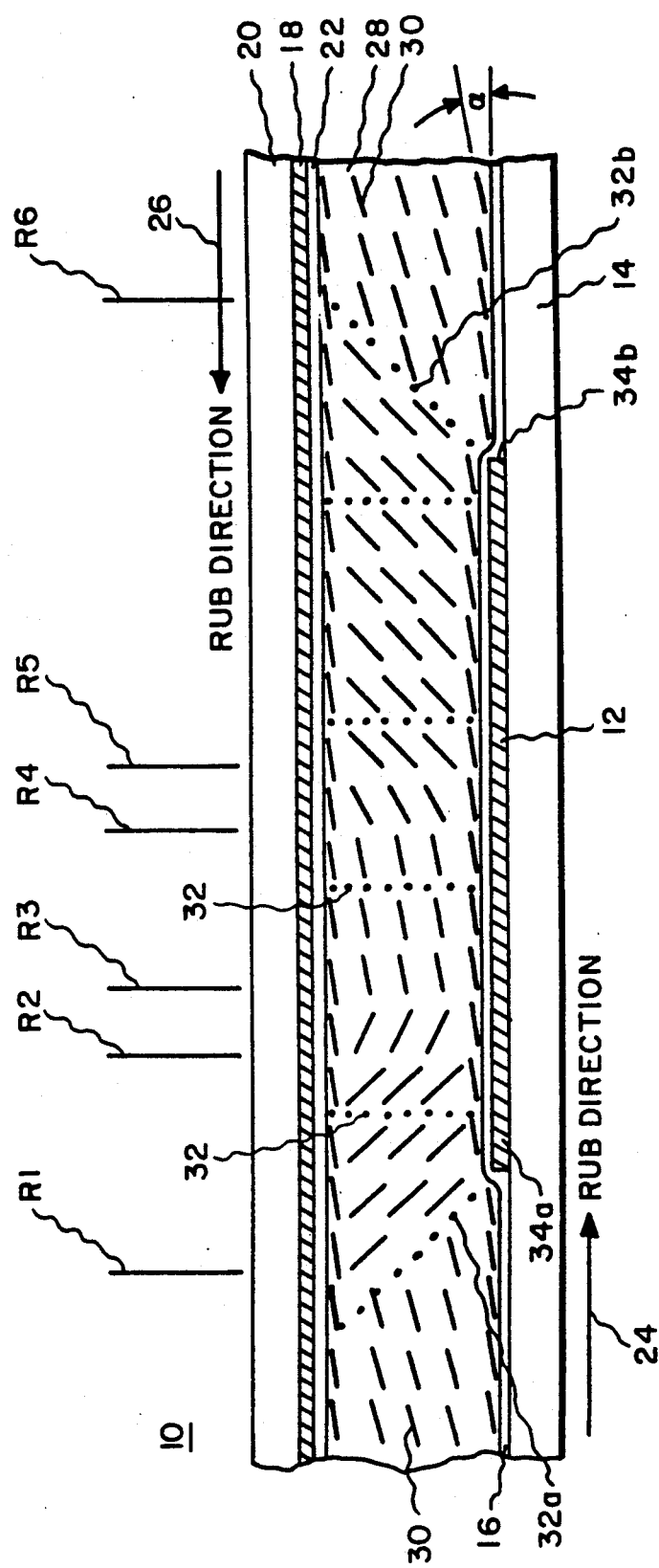
FIG. 1 is a cross-sectional view of a portion of a prior art liquid crystal device.

A cross-sectional view of a picture element 10, also referred to as a pixel or liquid crystal (LC) cell, is shown in FIG. 1. While the LC cell shown does not correspond to structures embodied by the present invention, it is nonetheless instructive to consider it for the differences which will become apparent. Pixel 10 includes a pixel electrode 12 of a transparent material, such as indium tin oxide (ITO) and the like, formed on a transparent substrate 14, preferably of glass. A polymer alignment layer 16 is desposed on the substrate surface and over pixel electrode 12. A ground plane electrode 18, common to all pixels in the device, is formed on a transparent panel 20 or cover glass. Another polymer alignment layer 22 is disposed over ground plane electrode 18 and cover glass 20. Polymer alignment layer 16 is rubbed, or buffed, in one direction (commonly reffered to as the direction) from one side edge (not shown) of device 10 to an opposite side edge (not shown) of device 10. A left-to-right rub direction is indicated in FIG.1 by arrow 24. Similary, polymer alignment layer 22 is also rubbed in one, opposite direction (arrow 26). This rub direction configuration is an anti-parallel-rub configuration. Cover glass 20 is attached to substrate 14 to sealably contain a quantity of liquid crystal material 28.

Liquid crystal material 28 includes a multiplicity of elongated LC molecules 30. When LC material 28 is introduced into device 10, LC molecules 30 will each be aligned with a longitudinal axis extending substantially parallel to rub directions 24 and 26. The longitudinal axis of each LC molecule 30 will also slope in rub direction 24 (from left to right) toward cover glass 20 at an unexcited-pre-tilt angle $\alpha$ of about one to about three degrees relative to a plane substantially parallel to substrate 14 and cover glass 20.

Those skilled in the art will note that the rub directions and slope direction of unexcited LC molecules 30 shown in FIG. 1 are merely for purposes of explanation. The rub directions could be in any opposed directions across device 10 such as diagonally or the like and the direction of slope of the LC molecules will be determined by the rub direction, the characteristics of the particular liquid crystal material used and the type of polymer used for alignment layers 16 and 22; thus, the longitudinal axis of LC molecules 30 could equally slope in the opposite direction (from right to left) toward cover glass 20.

Liquid crystal material 28 preferably has a positive dielectric anisotropy; therefore, LC molecules 30 will attempt to substantially align themselves with an electric field (dotted lines 32) induced between pixel electrode 12 and ground plane electrode 18 when a voltage of proper polarity and magnitude is applied to pixel electrode 12 relative to ground electrode 18. The electric field will extend substantially perpendicularly between pixel electrode 12 and ground electrode 18 over most of the pixel electrode 12 but portions of the electric field (as denoted by dotted lines 32a 32b) will spread or radiate outwardly from the side edges 34a and 34b of pixel electrode 12 because ground electrode 18 is much larger than pixel electrode 12. Proximate to the center of pixel electrode 12 and extending to right side edge 34b, the electric field lines 32 are less than about 90° relative to pre-tilt angle α (unexcited state). These LC molecules will pivot upwardly from the pre-title angle α, in the same rotational sense as pre-tilt angle α, toward the direction of electric field 32 when voltage is applied to electrode 12. The electric field lines 32a proximate to pixel electrode left edge 34a are at an angle greater than about 90° relative to pre-tilt angle α; this causes the LC molecules proximate to left edge 34a to pivot upwardly from pre-tilt angle α, in an opposite rotational sense from pre-tilt angle α, toward the direction of electric field line 32a.

LC molecules 30 between reference lines R1 and R2 and bounded on the left by electric field line 32a have a reverse-normal or opposite tilt in the excited state and are referred to as being a reverse-normal-tilt region. Those LC molecules to the left of electric field line 32a are unexcited and remain at the pre-tilt angle. A field-induced disclination or inversion wall occurs in a central region between reference lines R3 and R4. The LC molecules in the inversion wall will remain at the pre-tilt angle. The inversion wall is bounded on the left by a transition region between reference lines R2 and R3 and on the right by another transition region between reference lines R4 and R5. LC molecules 30 between reference lines R5 and R6 and bounded on the right by electric field line 32b have a normal angle of tilt in the excited state, according to the magnitude of the voltage applied to pixel electrode 12, and are referred to as being in the normal-tilt region.

A coherent light beam, such as laser light and the like, entering device 10 at substrate 14 will see two different phase changes; one in the reverse-normal-tilt region (R1-R2) and another in the normal-tilt region (R5-R6); thus, the light will be deflected or split in two different directions. The inversion wall or disclination line (R3-R4) appears as a colorless line (black, white or gray depending on the orientation of entrance and exit polarizers, not shown) across the face of the pixel, when device 10 is viewed normal to cover glass 20, flanked by the transition regions which will have a level of brightness between that of the inversion wall and the normal-tilt region and reverse-normal-tilt region.

In the birefringence mode of LC devices, the unexcited LC molecules may cause the disclination line to appear green depending upon the orientation of the polarizers, and the excited LC molecules in the normal-tilt region and reverse-normal-tilt region may appear red. At pixel electrode voltages below some level, e.g. below about 2 volts, the transition regions may not be visible; the pixel will typically appear red with a thin green line extending parallel to left side edge 34a. As the pixel electrode voltage is increased above that level, e.g. above about 3 volts, the transition regions flanking the disclination line or central region (R3-R4) appear as dark or light lines (almost colorless) depending upon the polarizer orientation. At a higer level, e.g. above about 5 volts, the transition regions "pinch" together and the disclination line becomes a zig-zag line closer to the center of the pixel.

Figure 2A:
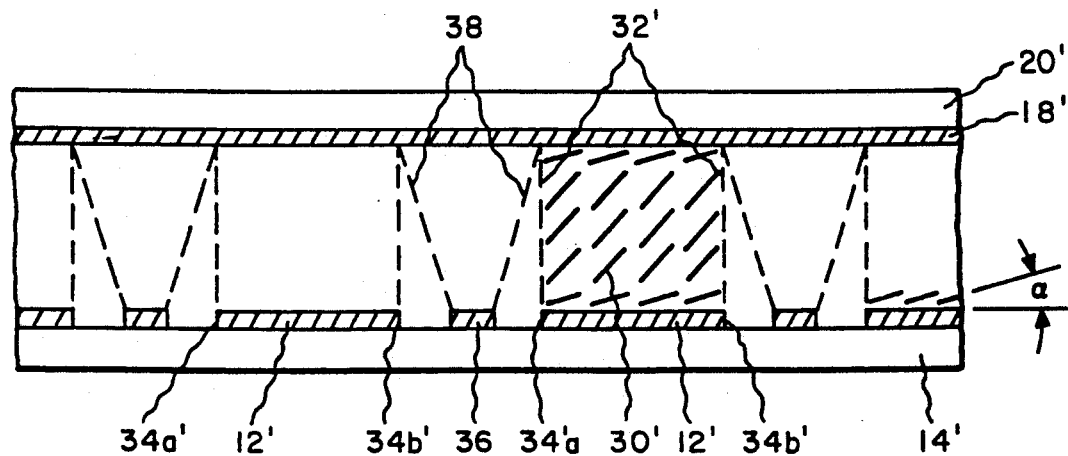
FIG. 2A is a cross-sectional view of a portion of a liquid crystal device in accordance with one embodiment of the present invention.

In accordance with one embodiment of the present invention; a field correction electrode (FCE) 36 is formed on substrate 14' symmetrically between adjacent pixel electrodes 12' (FIG. 2A). When a pixel electrode voltage is applied, a FCE voltage of proper polarity and mangnitude is simultaneously applied to FCE 36 relative to ground plane electrode 18'. The FCE voltage induces an electric field (indicated by broken lines 38) which adds to the electric field induced by the pixel electrode voltage and causes electric field lines 32' to extend substantially perpendicularly between electrode 12' and ground plane electrode 18'. Electrode field lines 32' at pixel electrode left edge 34a' are in at an angle less than about 90° relative to pre-tilt angle α; therefore, the LC molecules proximate to left edge 34a' will be pivoted upwardly in the same rotational sense as pre-tilt angle α and no disclination line or inversion wall will be created.

If the FCE voltage is too large, the electric field may be over corrected and cause the electric field at the right side edge 34b' of the pixel immediately to the left of FCE 36 to bend at a greater than about 90° relative to pre-tilt angle α; thus creating a disclination line proximate to pixel electrode right edge 34b'.

Figure 2B:
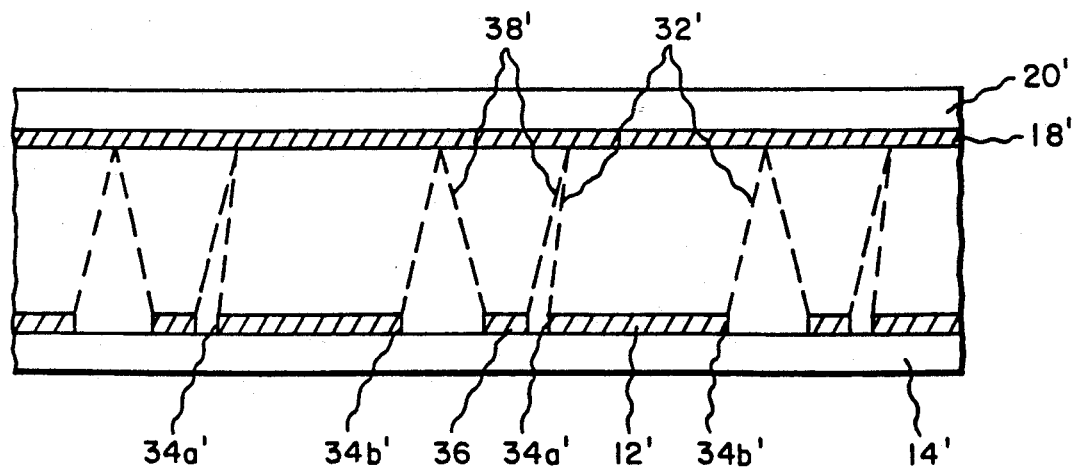
FIG. 2B is an alternate embodiment of the device of FIG. 2A.

In accordance with an alternate embodiment of the present invention, FCE 36 is preferably disposed closer to pixel electrode left side 34a' (FIG. 2B) to prevent over correcting the electric field. The field induced by the FCE voltage will therefore have little or no effect on the electric field induced by the voltage applied to the pixel electrode immediately to the left of FCE 36, and the pixel electrode induced field 32' will be bent slightly to the right by FCE induced field 38' (FIG. 2B).

Figure 3A:
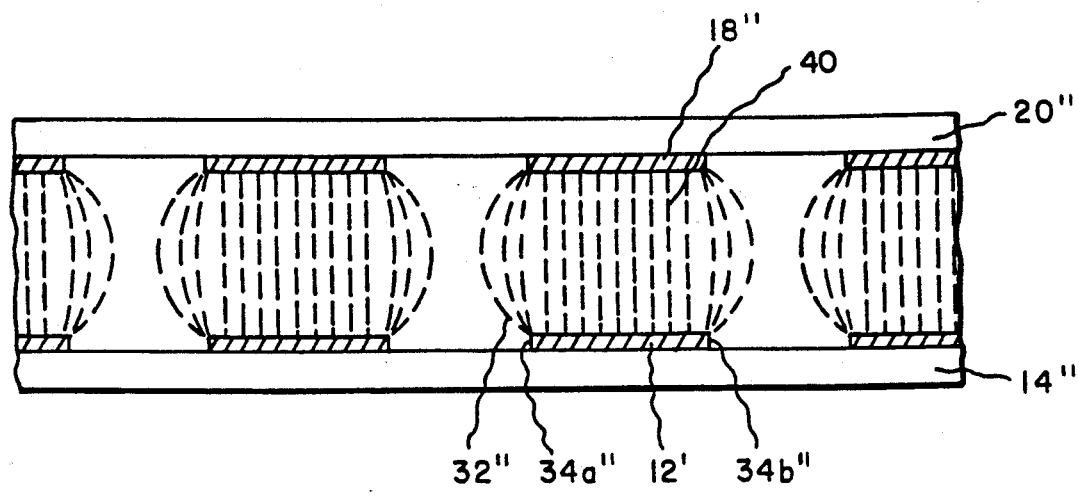
FIG. 3A is a cross-sectional view of a portion of a liquid crystal device in accordance with another embodiment of the present invention.
Figure 3B:
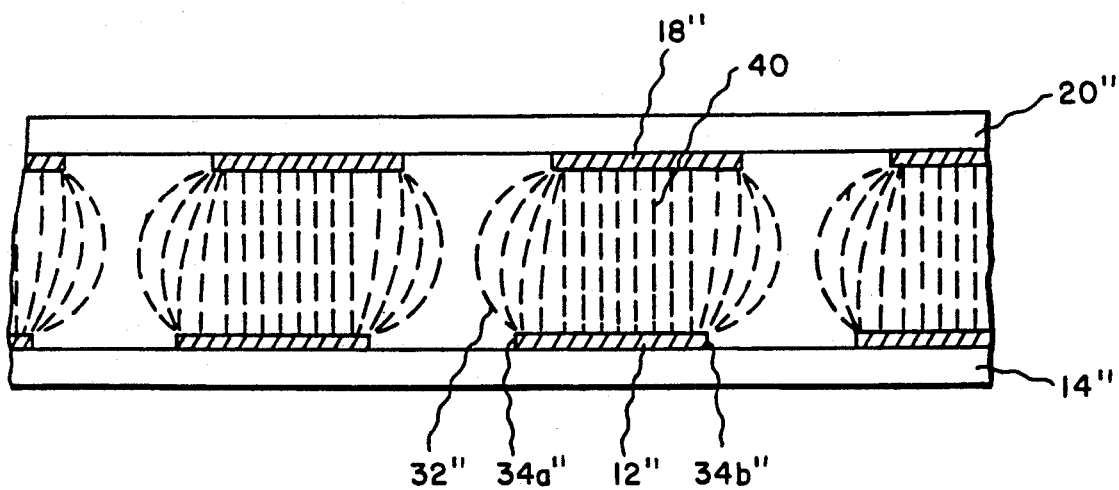
FIG. 3B is an alternate embodiment of the device of FIG. 3A.

In accordance with a futher embodiment of the present invention, the common ground plane electrode may be patterned to form plurality 18" of the groung plane electrodes which each substantially correspond to a different associated pixel electrode 12" in size and shape (FIG. 3A). The resulting electric field 32" would extend between pixel electrode 12" and ground plane electrode 18" at an angle less than about 90° relative to the pre-tilt angle of the LC molecules in an active area 40 bounded between pixel electrode side edges 34a" and 34b"; thus, no disclination line would be induced. Each ground plane electrode 18" may be patterned and displaced a selected distance, for example, about 7 microns, to the right of its associated pixel electrode 12" (FIG. 3B). This electrode configuration will tilt electric field lines 32" to the right to insure that the electric field will be less than 90° relative to the pre-tilt angle of the LC molecules and that no disclination lines can form.

Figure 4A:
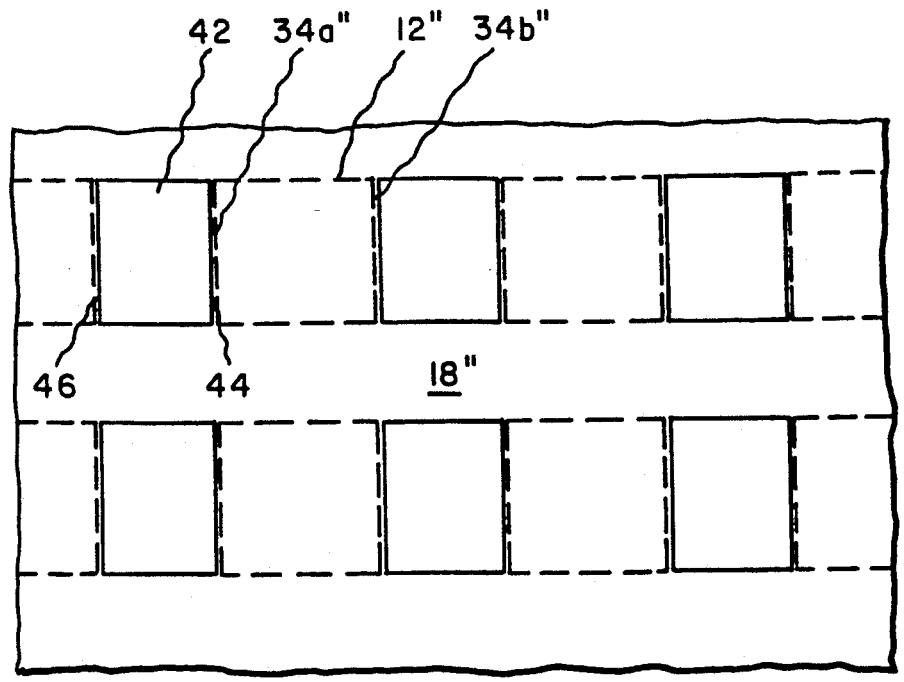
FIG. 4A is a plan view of a portion of a liquid crystal device in accordance with a further embodiment of the present invention.

In accordance with a still futher embodiment of the present invention, ground plane electrode 18" (FIG. 4A) may be patterned to have a plurality of windows 42 formed therein. A right side edge 44 of each window 42 will be substantially aligned with left side edge 34a" of pixel electrode 12" (shown by a broken line since pixel electrode 12" is hidden beneath ground plane electrode 18" in FIG. 4A). A left side edge 46 of window 42 is spaced sufficiently from pixel electrode left side 31a" to cause decoupling of the electric field between side edges 46 and 34a" when a voltage is applied to pixel electrode 12" relative to ground plane electrode 18". The electric field will therefore extend substantially perpendicularly between pixel side edge 34a" and window side edge 44 and no disclination line will be induced.

Figure 4B:
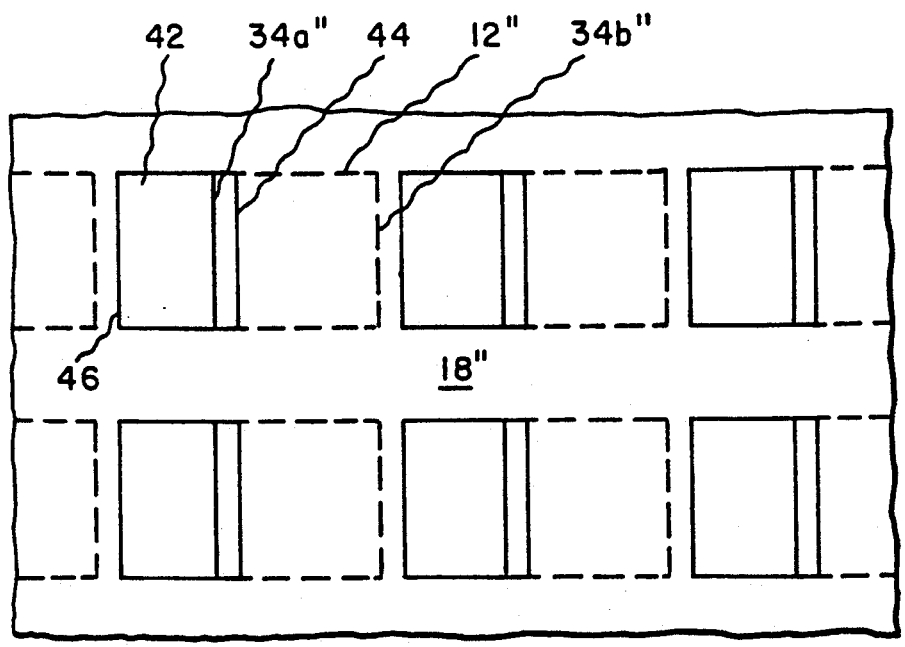
FIG. 4B is a plan view of an alernate embodiment of the device of FIG. 4A.

Window 42 may also be displaced or widened to the right by a selected width, for example about 7 microns, so that window side edge 44 is displaced to the right of pixel electrode side edge 34a" (FIG. 4B). This configuration will tilt electric field lines to the right similar to FIG. 3B and a disclination line will be avoided. Window side edge 46 must be spaced sufficiently from pixel electrode side edge 34a" to insure decoupling of the electric field between the two side edges when a voltage is applied to pixel electrode 12".

It will be readily understood by those skilled in the art that the present invention is not limited to the specific embodiments described and illustrated herein. Different embodiments and adaptations besides those shown herein and described, as well as many variations, modifications and equivalent arrangements, will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the sprit and scope of the claims appended hereto.

What is claimed is:

1. A liquid crystal device, comprising:
   a transparent substrate;
   at least one pixel electrode formed on said transparent substrate and having opposed first and second side edges;
   a transparent cover plate disposed in parallel alignment with said substrate and spaced therefrom;
   at least one ground plane electrode having first and second side edges corresponding to said pixel electrode first and second side edges, said ground plane electrode being formed on the surface of said transparent cover plate opposite said at least one pixel electrode; and
   a multiplicity of liquid crystal molecules sealably contained between said substrate and said cover plate each molecule having positive dielectric anisotropy and having a longitudinal axis aligned in a selected rub direction at an unexcited pre-tilt angle relative to a plane parallel to said substrate:
   said ground plane electrode being patterned so that said first side edge of said ground plane electrode is displaced a selected distance from substantial vertical alignment with said at least one pixel electrode first side edge toward said at least one pixel electrode second side edge so as to orient an electric field, induced between said at least one pixel electrode and said ground plane electrode, said electric field being substantially in the same direction as the alignment of said longitudinal axes of said liquid crystal molecules, to avoid a disclination line or inversion wall proximate to said first side edge when a voltage of proper polarity and magnitude is applied to said pixel electrode relative to said ground plane electrode.

2. The device of claim 1, wherein said at least one pixel electrode and said ground plane electrode comprise indium tin oxide.

3. The device of claim 1 wherein said patterned ground plane electrode is substantially the same size and shape as said at least one pixel electrode.

4. The device of claim 3 wherein said selected dictance is about 7 microns.

5. The device of claim 1, wherein said ground plane electrode has at least one window formed therein, the dimensions of said at least one window defining said ground plane first and second side edges.

6. A liquid crystal display device comprising:
   a transparent substrate;
   a multiplicity of pixel electrodes formed on said transparent substrate and having opposed first and second side edges;
   a transparent cover plate disposed in parallel alignment with said substrate and spaced therefrom;
   a multiplicity of ground plane electrodes formed on the surface of said transparent cover plate opposite said mulitiplicity of pixel electrodes, each ground plane electrode being disposed substantially opposite a respective pixel electrode, each of said ground plane electrodes having first and second side edges corresponding to said first and second side edges of said respective pixel electrode; and
   a multiplicity of liquid crystal molecules sealably contained between said substrate and said cover plate, each molecule having positive dielectric anisotropy and having a longitudinal axis aligned in a selected rub direction at an unexpected pre-tilt angle relative to a plane parallel to said substrate;
   each of said ground plane electrodes being patterned so that said first side edges of said ground plane electrodes are displaced a selected distance from substantial vertical alignment with respective ones of said pixel electrode first side edges toward said respective pixel electrode second side edges so as to orient an electric field, induced between said pixel electrodes and respective ones of said ground plane electrodes, electric field being substantially in the same direction as the alignment of said longitudinal axes of said liquid crystal molecules, to avoid a disclination line or inversion wall proximate to respective ones of said pixel electrode first side edges when a voltage of proper polarity and magnitude is applied to said pixel electrode relative to said respective ground plane electrode.

* * * * *